(No Model.) 7 Sheets—Sheet 2.
G. W. PACKER.
SLAT AND WIRE FENCE MACHINE.

No. 377,327. Patented Jan. 31, 1888.

Fig. 2.

WITNESSES
Edwin L. Yewell.
Jos. A. Ryan

INVENTOR
Geo. W. Packer
By Manahan & Ward,
Attorneys (No Model.) 7 Sheets—Sheet 3.

G. W. PACKER.
SLAT AND WIRE FENCE MACHINE.

No. 377,327. Patented Jan. 31, 1888.

Fig. 3.

WITNESSES
Edwin L. Yewell
John Enders Jr.

INVENTOR
Geo. W. Packer.
By Manahan & Ward
Attorneys (No Model.) 7 Sheets—Sheet 4.

G. W. PACKER.
SLAT AND WIRE FENCE MACHINE.

No. 377,327. Patented Jan. 31, 1888.

WITNESSES
Edwin L. Yewell
Mortimer Redman

INVENTOR.
Geo. W. Packer.
By Manahan & Ward
Attorneys

(No Model.) 7 Sheets—Sheet 6.

G. W. PACKER.
SLAT AND WIRE FENCE MACHINE.

No. 377,327. Patented Jan. 31, 1888.

WITNESSES
Edwin L. Yewell.
Mortimer Redman.

INVENTOR
Geo. W. Packer
By Manahan & Ward
Attorneys

(No Model.) 7 Sheets—Sheet 7.

G. W. PACKER.
SLAT AND WIRE FENCE MACHINE.

No. 377,327. Patented Jan. 31, 1888.

WITNESSES
Edwin L. Yewell.
Mortimer Redman

INVENTOR
Geo. W. Packer,
By Manahan & Ward.
Attorneys

UNITED STATES PATENT OFFICE.

GEORGE W. PACKER, OF ROCK FALLS, ILLINOIS.

SLAT-AND-WIRE-FENCE MACHINE.

SPECIFICATION forming part of Letters Patent No. 377,327, dated January 31, 1888.

Application filed November 29, 1887. Serial No. 256,472. (No model.)

*To all whom it may concern:*

Be it known that I, GEORGE W. PACKER, a citizen of the United States, residing at Rock Falls, in the county of Whiteside and State of Illinois, have invented certain new and useful Improvements in Slat-and-Wire-Fence Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a machine for manufacturing slat-and-wire fences. The fence, when complete and in position for use, consists of vertical equidistant slats inserted through five horizontal wire cables. These cables consist, respectively, of two fence-wires which are intertwisted in the interval between the slats, and the compression upon the slats caused by this twisting serves to hold the latter in position. The process of making this product involves mechanism for moving the slat laterally between the wires constituting the cable before said wires are twisted; mechanism for pushing the slat slightly upward into place between said wires, and thereby advancing the wires; mechanism for twisting the wires behind said slat, and mechanism for winding the finished product on a superposed reel.

For the purpose of attaining greater clearness in the specific description hereinafter contained of the mechanism and operation of my invention, I will first give a general description of its mode of operation. The wires to be utilized for the horizontal cables aforesaid are first coiled upon reels, which latter are suspended in pairs upon the rotating vertical twisting-shafts and adapted to rotate in a horizontal plane with said shafts. One wire from each of said twin spools is then drawn upward through suitable holes in the horizontal gear affixed to the upper end of the shaft carrying said reels, and said wires are thereby held apart a sufficient width and distance above said gears to permit the insertion laterally from a lateral hopper of a slat between each pair of said wires. The slat is progressed in a horizontal plane from the bottom of the lateral hopper over and upon the upper surface of the horizontal gears aforesaid, being directed in its progress by opposing segmental-curved guides seated edgewise on the upper face of said horizontal gears, and necessarily rotated intermittingly with the latter. The finished product is attached at its upper end to a winding axle or shaft journaled above and parallel with the line of said gears, which is given an intermittent rotation. After the slat has passed over and rests upon the upper surface of the gears aforesaid, being then between each pair of said wires and between the guides aforesaid, which are carried on said gears, before any twisting of the wires can be had the slat is lifted in a horizontal position vertically to the desired distance from the next previous slat to constitute the intended interval between the slats and a sufficient height to clear the gears aforesaid and their imposed guides, and to permit the necessary rotation of said gears to accompish the twisting of the wires. The slat is thus lifted by pushers, which are round rods set longitudinally in the center of each of said shafts, which carry the horizontal gears and wire-reels aforesaid. These pushers, by mechanism to be hereinafter described, have a reciprocating movement in a vertical plane and push the slat upward snugly between the last previous twist of said wires, and continue to lift said slat, and thereby draw the wires upward through said gears a sufficient distance to leave room below said slat for the next twist of said wires. Spring-dogs, by means of coiled springs, are automatically thrown under said slat when the latter has reached its altitude, and hold said slat in position during the process of the next succeeding twisting and resist the draw of the latter process, the pushers previous to said twisting having been withdrawn in order to permit the twisting and to make room for the insertion of the next succeeding slat. The path of the wires upward through the gears is prolonged into vertical pipes integral with said gear, (see Figure 3,) which hold said wires apart sufficiently to permit the end insertion of said next slat. The slat being now suspended above and clear of said gears and their imposed guides, the latter are free to rotate, and there is imparted to them coincidently two revolutions in a horizontal plane to accomplish the twisting of the wires between the slats. After this is done the gears remain stationary, with the interval between their imposed guides in a line transversely of the machine, and in prolongation of the bottom of the hopper. The next slat is then moved in between said guides from a hopper supported contiguous to and at one end of the frame which contains said wires and twisting mechanism aforesaid. Coincidently with the said upward movement of the pushers the axle upon which the finished product is wound is given a partial rotation, which, on the periphery of the wound product, equals the movement of said pushers. When the new slat is passed between the guides aforesaid and rests upon the upper surface of said gears, the wire of each pair of wires is on opposite sides of said slat. The vertical reciprocating pushers are then actuated, the gears meanwhile remaining stationary, and said new slat is pushed upward, as aforesaid, against the last twist of said wires, and sufficiently far to be engaged and held by the said automatic dogs, when the gears and guides are again intermittently rotated and the twisting accomplished as before described.

In the drawings, Fig. 5$^a$ is a view from the rear from a point just within the rear plate of the machine-bed, and Fig. 5$^b$ is a plan of the same parts with the driving mechanism added. Fig. 6 is a vertical section of one of the vertical twisting-shafts. Fig. 7 is a cross-section of same in line $x$ $x$ of Fig. 6. Fig. 8 is a perspective of the upper end of said twisting-shaft with the pusher seated therein.

A is the frame of the machine proper, which contains and supports the mechanism for manufacturing the product after the slat is inserted. The machinery for containing and inserting the slats between the aforesaid wires is auxiliary to the mechanism aforesaid, and is sustained on the secondary hopper-like frame B, contiguous to one end of the frame A and in line therewith.

Figure 1:
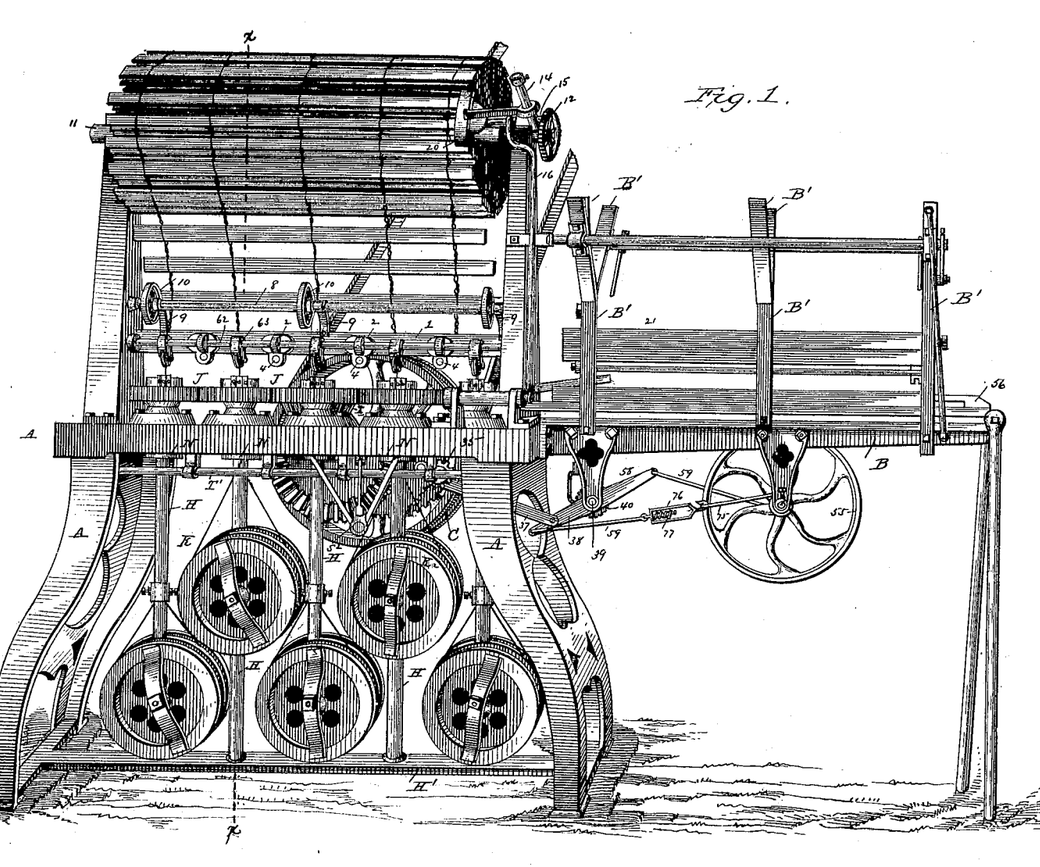
Fig. 1 is a perspective of the front side of a machine embodying my invention.
Figure 2:
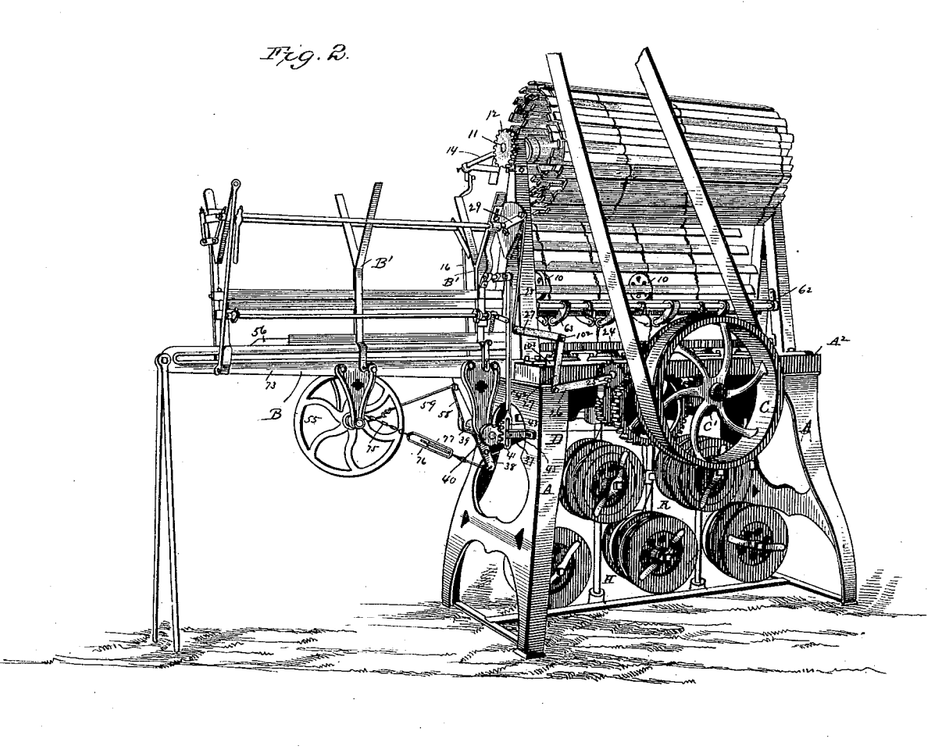
Fig. 2 is a like rear perspective.

C, Fig. 2, is a driving-pulley, through the medium of which motion is imparted to the machine. On the inner face of the pulley C, and integral therewith, is a small pinion, C', which, with the pulley C, rotates loosely on the supporting horizontal shaft C$^2$. The pinion C' engages and actuates the gear D, rigidly seated on the horizontal shaft D', journaled parallel with the shaft C$^2$. On the rotating shaft D' is rigidly keyed a mutilated gear, E, which engages and intermittingly rotates a mutilated gear, F, keyed on the shaft C$^2$, whereby there is imparted intermittent rotation to said shaft C$^2$. On the latter shaft is also keyed a bevel-gear, G, which engages with and actuates a bevel horizontal gear, I, cast under and integral with the central horizontal gear J on the top of the central vertical shaft H, which carries the horizontal gear aforesaid.

The vertical shafts H H H H H are arranged in line, are stepped at their lower ends in a horizontal plate, H', and journaled at their upper ends in the boxes A', seated on the bed-plate A$^2$ of the frame A. On the upper ends of the vertical shafts H are keyed, respectively, horizontal gears J, to which reference has been before made. The gears J are all of the same size and intermesh, and the intermittent rotation imparted to the central gear J through the bevel-gear I, integral therewith, is communicated in the same degree to the residue of said gears J.

Below the bed-plate A$^2$, and at suitable points, are attached to the vertical shafts H twin wire-reels K, from each of which is unwound the wires K'. The reels K are suitably pivoted with their axles perpendicular to the shafts H, and are carried with the latter in their rotation.

Figure 5A:
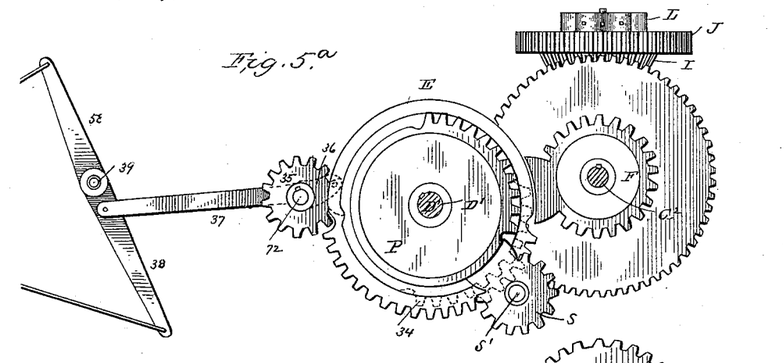

On each of the wire-reels K is attached a spring-brake, K$^2$, to prevent the casual unwinding of the wire therefrom in excess of the amount needed. In each of the gears J are formed two wire-holes, J', through which the wires are drawn vertically from said reels K. On the upper surface of the gear J are formed horizontal twin guides L, (see Fig. 5,) between which the slat is projected from the hopper B, and the ends of which flare outward somewhat to more readily afford admission to said slat.

The guides L are made somewhat elastic, so as to loosely clamp the slat when the latter is in position between them. The guides L are so arranged on the gears J that the intervals between them, respectively, shall be in line with the incoming slat when the gears J are in a state of rest.

Figures 5B, 6, 7, 8:
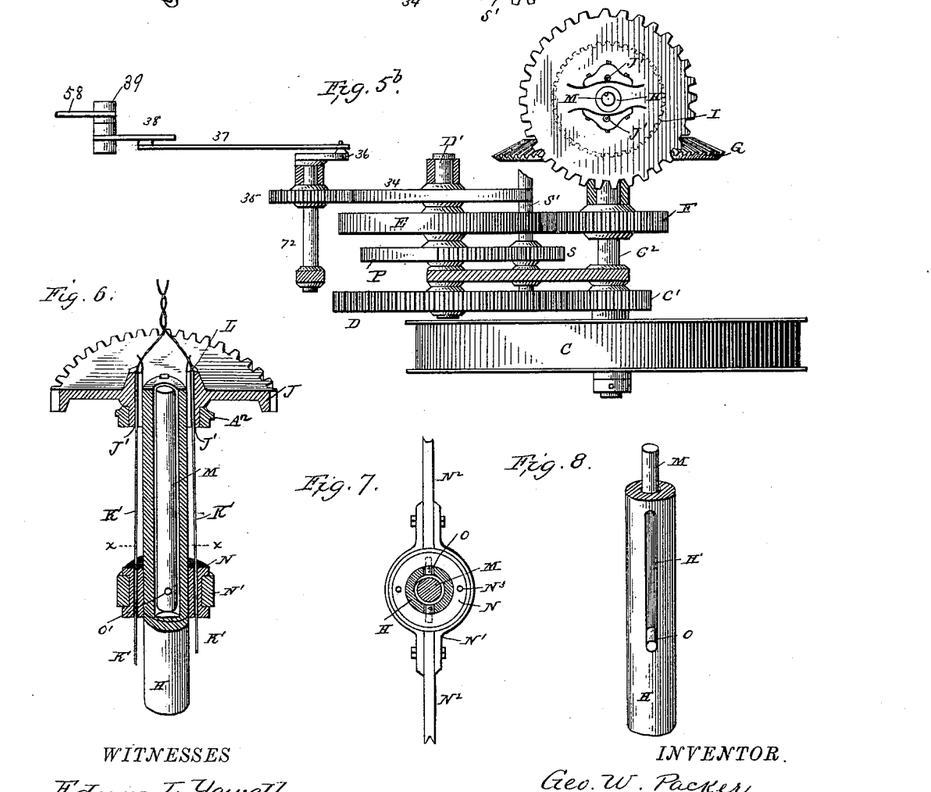

The upper ends of the shafts H are made hollow, and in this cavity are respectively seated loosely pushers M, which are reciprocated in a vertical plane, and so as to project intermittingly above the gears J, in the following manner:

Below the bed-plate A$^2$ are loosely seated around the several shafts H collars N, which are adapted to be reciprocated on the shafts H, and which are seated, respectively, in boxes N', which latter are interconnected by bars N². A short pin, O, Figs. 6, 7, and 8, is passed horizontally through the pushers M and the shaft H, and has each of its ends inserted in suitable sockets, O', formed in the inner walls of the collars N. Where the pins O project through shaft H so as to reach the collar N a vertical slot, H', is formed in the shaft H, so that the pin O and pushers M may be moved lengthwise of said shaft without hinderance from said shaft, the pin O in such movement traversing the slot H' and carrying the pushers M.

The collars N rotate in the boxes N' with the shafts H, and vertical wire-holes N³ are formed in said collars to prevent the wires K' from coming in contact with the bars N², the wires K' being carried in the holes N³.

The collars N are reciprocated on the shafts H for the purpose of giving intermittent reciprocal movement to the pushers M aforesaid, as follows: On the shaft D', between the gears D and E, is rigidly seated a mutilated gear, P, which engages and intermittingly rotates a smaller mutilated pinion, S, seated rigidly on the shaft S', suspended below the bed-plate A² at the rear of the machine.

The shaft S' is extended through the machine, and at its opposite end is provided with a crank, S², to the wrist of which is attached the vertical pitman S³. The upper end of the pitman S³ is attached to an arm, T, formed on the rock-shaft T', journaled under the bed-plate A² parallel therewith and extending the full length of said bed-plate A². On the rock-shaft T', at suitable intervals, are seated, adjustable by means of a set-screw, T², radial arms T³. Each of the arms T³ has attached at its outer end a segmental rim, T⁴, and to the upper end of the rims T⁴ are attached short belts T⁵, and the lower ends of such belts are attached to the bar N', which connects and carries the collars N.

The mutilated gear P imparts intermittent rotation to the pinion S, which, through the medium of the shaft S', actuates the pitman S³ on the opposite side of the machine and rocks the rock-shaft T, thereby lifting on the belts T⁵ and raising the bar N' and collar N, which, as before described, has the effect of projecting the pushers M upward at the upper end of the shaft H and forcing the slat upward into place, as before described.

Figures 9, 10, 11, 12:
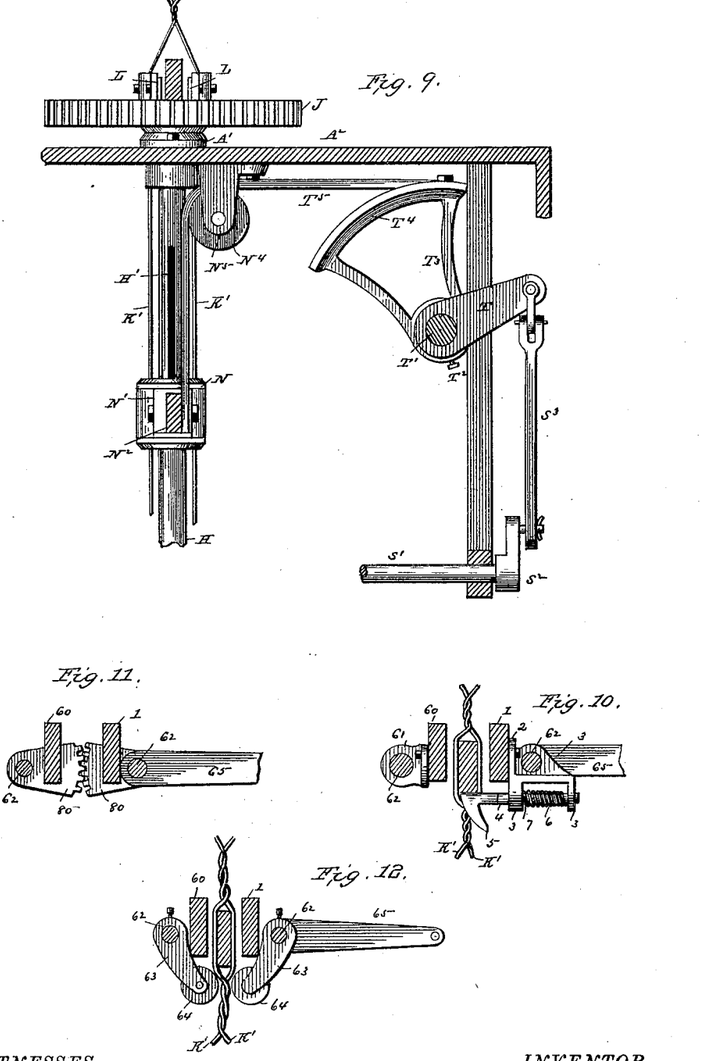
Fig. 9 is a detail of mechanism for raising the pushers.
Fig. 10 is a partial cross-section showing the position and action of the dogs which support the slat while the wires are being twisted below the latter, and thereby resist the downward draw of the twisting.
Fig. 11 is a partial cross-section in line $x$ $x$ of Fig. 4, showing mode of rocking the shafts which carry the pulleys which press the wires together beneath the slat. (See Fig. 12.)
Fig. 12 is a partial cross-section showing the location and operation of said pressing-pulleys.
Figure 13:
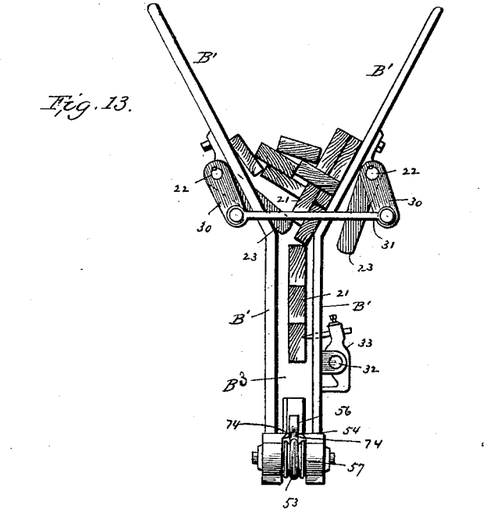
Fig. 13 is an elevation of the outer end of the feed-hopper.
Figure 14:
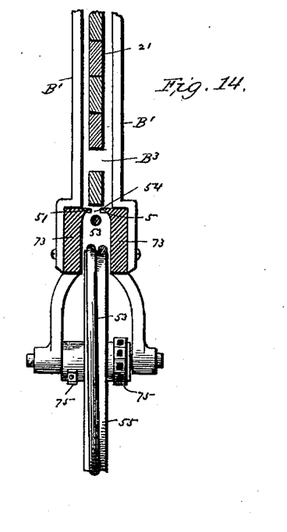
Fig. 14 is a partial cross-section of the feed-hopper in line $y$ $y$ of Fig. 4.

Guide-pulleys N⁴ are seated against the lower side of the bed-plate A² in brackets N⁵ at the altitude of the segment T⁴, with their inner curving surfaces projected slightly between the shafts H, so as to cause the belts T⁵ to lift vertically on bars N². (See Fig. 9.) The weight of the collars N and bars N² is sufficient to return them downward, and it is only necessary to provide mechanism for moving them upward.

A bar, 1, is attached at each end to the machine and extends the length of the latter above and in line with the upper ends of the shafts H, and to this bar at suitable intervals are attached brackets 2, having outer projecting ears, 3. In the ears 3 are loosely seated horizontal dogs 4, on the inner ends of which are formed the bevel heads 5. The head 5 is level on its upper surface. The bevel thereof extends downward and toward the body of the dog and front of the machine. By this formation as the slat is pushed upward by the pushers M said slats push against the lower end of the bevel-head 5 and force the dogs 4 toward the front of the machine to enable the slat to pass upward past said dogs. A coiled spring, 6, seated on the dogs 4 between the ears 3 3 and pressing at one end against the inner wall of one of said ears and at the other end against the transverse pin 7 in the dogs 4, throws the dogs 4 toward the rear of the machine and under the slat directly after the latter has passed above said dogs. These dogs 4 serve to hold the slat in place during the subsequent twisting of the wires and prevent any drawing backward of said slat or finished product in the process of twisting.

A bar, 60, similar to bar 1, parallel therewith and opposite thereto and directly behind bar 1 and a suitable distance therefrom to permit the passage upward between said bars of the slats and wires, is attached at each end to the machine similarly to bar 1 and extends the length of the machine. (See Fig. 12.)

Figure 3:
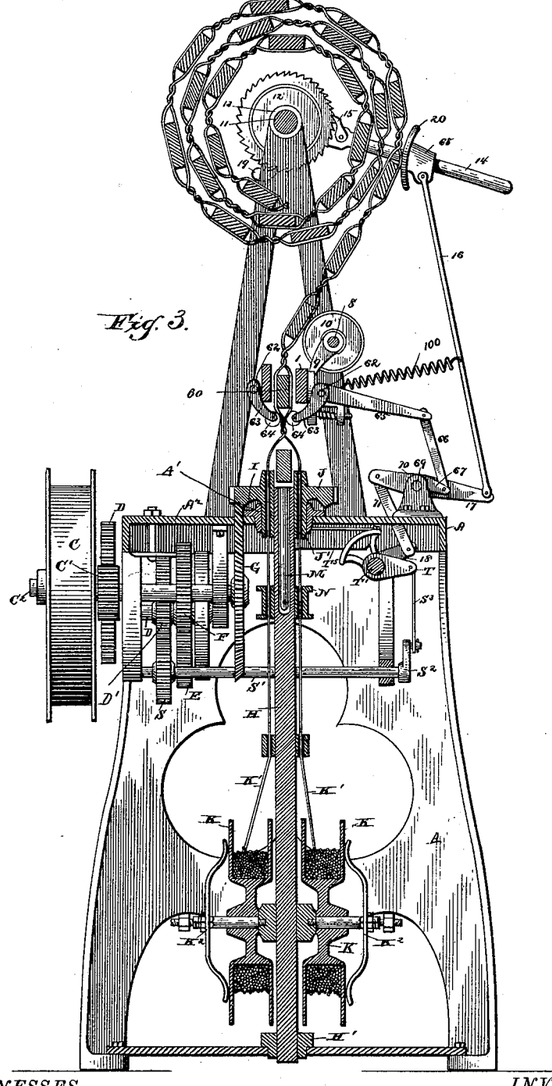
Fig. 3 is a vertical cross-section in the line $x$ $x$ of Fig. 1.

On the outside of and parallel with the bars 1 and 60 are respectively seated in brackets 2 of bar 1 and brackets 61 of bar 60 two rock-shafts, 62. On the rock-shafts 62, and opposite the points between the latter where the fence-wires pass upward, are rigidly affixed the downwardly and inwardly extending arms 63, on the lower ends of which are pivotally seated the sheaves 64, in the periphery of which are formed the usual annular grooves, and the sheaves 64 are thereby adapted to rest against the wires K', the latter respectively resting in the grooves of said sheaves. The sheaves 64 are coincidently rocked inwardly just before the twisting of the wires K' occurs, so as to cause said wires to remain vertical at the initiative of the twisting, and to hug closely the lower edge of the slat and cause the twist to begin close to said slat by the following mechanism:

On the front shaft 62 is rigidly seated the inner end of the horizontal arm, 65, Fig. 3, the outer end of which is pivotally attached to a vertical pitman, 66, the lower end of which pitman is pivotally attached to the outer end of a vertically-oscillating arm, 67, formed on the rock-shaft 69. The shaft 69 is rocked through the medium of the arm 70, pitman 71, and arm 18, (see Fig. 3,) and such rocking motion is coincidently communicated from the front shaft 62 to the rear shaft 62 by segmental gears 80, (see Fig. 11,) keyed, respectively, on the shafts 62 at the ends thereof next to the hopper B and adapted to interengage.

A shaft, 8, is suitably seated on brackets 9, which latter are attached to the bar 1. On the shaft 8, at suitable intervals, are pivotally seated friction-pulleys 10, the periphery of which abuts against the slats as they move upward from the bar 1, and serve to prevent the increasing size of the roll of finished product from drawing the lower slats and wires thereto attached out of a perpendicular position, the pulleys 10 being merely idlers.
In the upper end of the machine, and directly over and in line with the upper end of the shaft 8, is journaled an axle or intermittingly-rotating removable shaft, 11, whose function is to wind the finished product during the process of manufacture. There is imparted to this shaft 11 intermittent rotations of sufficient amount to wind the finished product as fast as it is made by the following mechanism: On the shaft 11 is rigidly seated a ratchet, 12, and on the end of the socket 13, in which the shaft 11 is journaled, is loosely sleeved the end of the horizontal arm 14, which extends toward the front of the machine and carries the pawl 15, adapted to engage the ratchet 12. On the arm 14 is loosely fitted the sliding sleeve 68, to which is pivotally attached the upper end of the pitman 16, the lower end of which latter is pivoted to the outwardly-extending horizontal arm 17, keyed on the outer end of the short horizontal rock-shaft 69, seated lengthwise on the frame A. The pitman 16 is connected with the frame by the coiled spring 100, which also allows all needed movement to this pitman. On the shaft 69, near its inner end, is keyed the inwardly-extending arm 70, to the end of which is pivoted the upper end of the downwardly-extending pitman 71, the lower end of which is pivoted to the outer end of the arm 18, formed on the rock-shaft T'.
The oscillation of the rock-shaft T', through the medium of the arm 18, pitman 71, and arm 70, imparts a rocking movement to the shaft 69, which, through the medium of the arm 17 and the pitman 16, intermittingly oscillates vertically the arm 14 and causes the pawl 15 to impart partial rotation to the ratchet 12 and shaft 11.

A reversely-acting dog, 19, suitably attached to the frame A, engages the ratchet 12 at each action thereof, and serves to hold the shaft 11 from unwinding. A shoe, 20, is formed on the inner end of the sliding sleeve 68 in such manner as to lie against the outside of the roll of finished product and move said sleeve outward on the horizontal arm 14, carrying the upper end of the pitman 16 therewith, so as to reduce the amount of rotation imparted to the ratchet 12 as the roll of finished product becomes larger, it being obvious that as the roll of said product increases in diameter a less amount of rotation will be required on the shaft 11 to take up the product as finished.

The foregoing description has had reference to the mechanism for seating the slat and twisting its attached wires after said slat has been received from the end of said mechanism upon the gears J and to the winding apparatus.

I will now proceed to describe the mode of automatically feeding said slats to the position last named.

The hopper B is seated at the end of and in line with the center of the frame A, and consists, mainly, of two opposing parallel sides, B', in line with the machine, and divergent at their upper portions and parallel and perpendicular at their lower portions, so as to form at said lower portions a vertical way, B³, of sufficient width merely to permit the slat to pass downward edgewise in a horizontal position, and not to allow such passage if the slat lies flat. The slats 21 are thrown into the hopper substantially in line therewith. When thus thrown into the hopper, the slats 21 lie at different angles and somewhat miscellaneously, and the following mechanism is used for the purpose of leveling them and feeding them, one at a time, horizontally endwise between the guides L on the horizontal gear J. The first thing is to level the slats 21, so they may drop into the vertical way B² edgewise and in a horizontal position. This is done by means of two rock-shafts, 22, extending the length of the hopper B, and journaled to the outside thereof a short distance above the lower end of the flare of its sides. To the rock-shafts are rigidly attached arms or stirrers 23, which extend downward, and in the oscillation of the shaft 22 alternately rock in against the slats lying in the lower portion of the flaring part of the hopper B at the point where said slats enter the vertical way B². It is obvious that if the slat at the entrance of the upper end of the way B² is lying at an angle to a horizontal plane one or more of the arms 23 in their partial inward stroke will abut against that part of the slat which is the lowest, and thus force the latter into a horizontal position, and as the arm 23 is rocked outward the lower slat thus pushed into a horizontal position will drop automatically edgewise into the way B².

Oscillation is imparted to the rock-shafts 22 as follows: A small pinion, 24, is seated on the rear of the frame A in position to be engaged and constantly rotated by the gear D. (See Fig. 2.) On the outer face of the pinion 24 is formed a crank wrist-pin, 25, to which is pivoted the inner end of the pitman 26, the outer end of which is pivotally attached to the lower end of the outwardly-extending arm of the bell-crank lever 27, the latter being suitably pivoted to the frame A at its angle. To the outer end of the horizontal arm of the bell-crank lever 27 is pivoted the lower end of the vertical pitman 28, the upper end of which pitman is pivotally attached to the horizontal arm 29, formed on and extending rearward from the rear rock-shaft 22.

The constant rotation of the pinion 24, through the medium of the wrist-pin 25, bell-crank lever 27, pitman 26, pitman 28, and arm 29 aforesaid, imparts constant oscillation to the rear rock-shaft 22, upon which said arm 29 is formed. The bell-crank lever 27 is pivoted to the bracket 101 at 102. On the outer ends of the rock-shafts 22 are formed, respectively, downwardly-extending arms 30, the lower ends of which are connected by the horizontal pitman 31, and therefore the oscillation aforesaid, communicated through the horizontal arm 29 to the rear rock-shaft 22, is extended to the opposite rock-shaft 22, and thereby said shafts 22 oscillate in unison, and the stirrers 23 thereon coincidently oscillate to and from the hopper B, each of said stirrers approaching said hopper as the other recedes therefrom.

Figure 15:
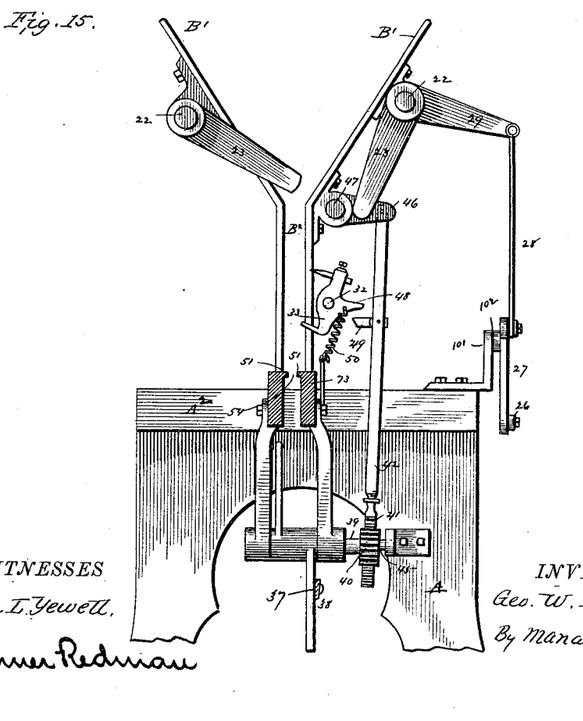
Fig. 15 is a partial perspective looking toward the machine from the line $z$ $z$ of Fig. 4.

In order to regulate the passage of the slats 21 through the way $B^2$, and to prevent said slats from being precipitated too rapidly down said way, another rock feed-shaft, 32, is journaled to the rear and outside of the way $B^2$, and extends the full length of said way. Near each end of the feed-shaft 32, Figs. 2 and 15, are respectively keyed thereon double-jawed dogs 33. The upper jaw of the dogs 33 has a pointed form adapted to be slightly inserted into the side of the slat 21, and the lower jaw is of a flange-like character adapted to be rocked under said slat to temporarily support the latter. The interval between the jaws of the dogs 33 is such that said jaws in each dog alternately operate—that is, when the lower jaw is rocked outward, so as to relieve and drop the slat 21 resting thereon, the same movement rocks the said upper or pointed jaw forward to engage and hold the slat next above until the lower jaw is in its forward position, so as to catch said second slat when it is released by the outward rocking of the upper jaw of said dog.

Proper oscillation is imparted to the rock feed-shaft 32 as follows: A third mutilated gear, 34, is seated rigidly on the shaft D' inside of the mutilated gear E aforesaid, and the gear 34 engages and intermittingly rotates a mutilated pinion, 35, rigidly seated on a short horizontal shaft, 72, journaled under the bedplate $A^2$ at that side of the gear 34 toward the hopper B. On the inner end of the shaft 72 is formed a wrist-pin, 36, on which is pivoted the inner end of the pitman 37, the outer end of which is pivoted to a downwardly-extending arm, 38, formed on the horizontal rock-shaft 39, suitably journaled below and near the inner end of the hopper B. On the rear end of the rock-shaft 39 is keyed a small segmental gear, 40, which engages a rack, 41, formed upon the vertical reciprocating rod 42. The lower end of the rod 42 is provided with the vertical slot 43, within which is projected a friction-roller, 44, seated laterally on a horizontal arm, 45, affixed to the frame A. The upper end of the rod 42 is carried and guided by being attached at such upper end to the outer end of a horizontal arm, 46, the inner end of the arm 46 being pivotally seated on the short horizontal post 47, formed on a bracket attached to the outside of the rear of the hopper B' B'.

On the rock feed-shaft 32, opposite to the vertical rod 42, is formed the rearward-extending arm 48, and oppositely thereto and slightly below it on the rod 42 is formed the forwardly-extending arm 49. When the rod 42 is carried upward by the oscillation in one direction of the rock-shaft 39, the arm 49 engages the lower side of the arm 48, and, lifting the latter, oscillates the feed-shaft 32 upward at its rear side, so as to throw the upper dog 33 inward and the lower dog outward, thus arresting temporarily the next to the lower slat resting on said dogs in the way $B^2$ and releasing and dropping to the lower end of said way the last slat which heretofore rested on the lower jaw of said dogs.

A coiled spring, 50, attached at its upper end to the rear side of the feed-shaft 32 and at its lower end to the rear of the hopper B, by drawing downward returns the shaft 32 and throws the lower jaw of the dogs 33 inward, so as to catch the next slat above it, and the upper jaw of said dogs outward, so as to release said slat, when the arm 49 on the rod 42 is drawn downward by the rocking given to the segmental gear 40. Thus the jaws of the dogs 33 coincidently move in opposite directions and alternately engage and release the same slat.

Figure 4:
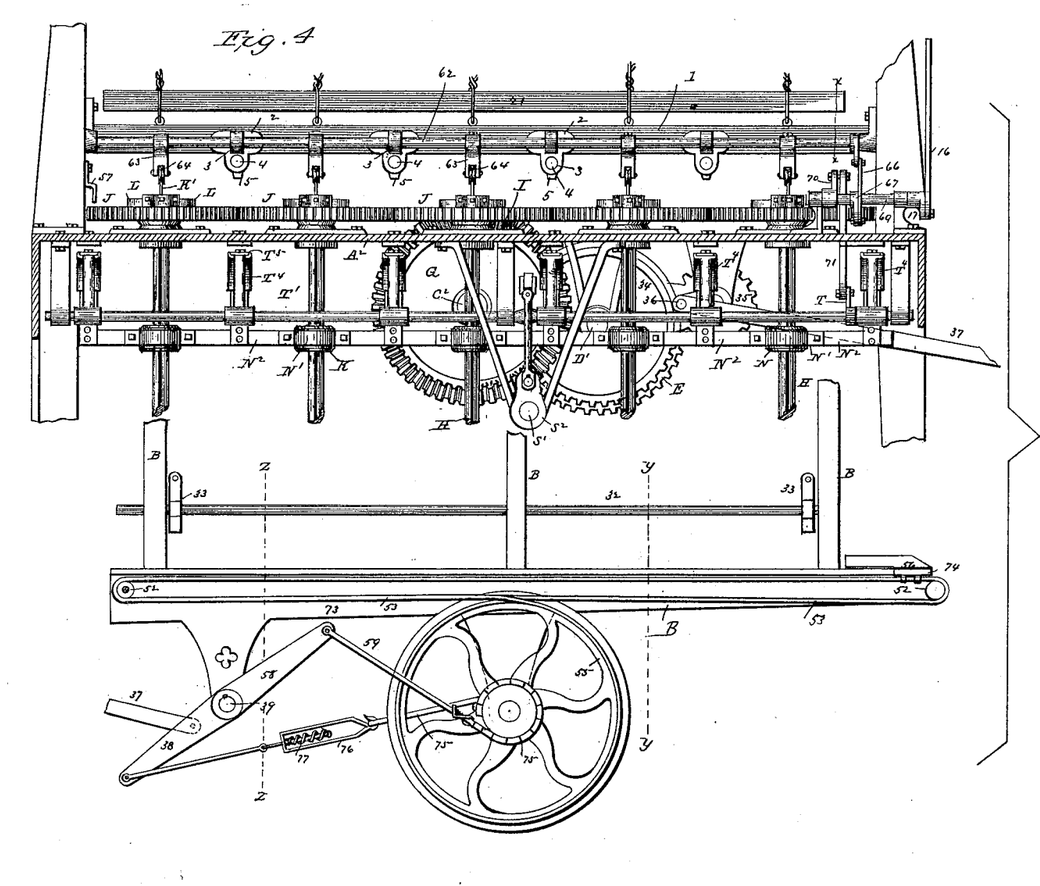
Fig. 4 is a partial front elevation with the front portion of the bed-plate and one of the plates which support the lateral feed removed.

The slat 21 is fed from the bottom of the way $B^2$ into the twisting mechanism as follows: At the lower end of the way $B^2$ are two horizontal bars, 73, extending out under said ways from the adjacent end of the frame A, the upper surface of said bars 73 being in the same horizontal plane with the upper face of the gears J. These bars 73 also serve to support the hopper B. The bars 73 project parallel with each other, with a slight interval, 54, between them, and on the inner face of each of said bars, at the top thereof, there is also formed the long horizontal flange 51. At each end of the bars 73 are seated transversely belt-pulleys 52, adapted to carry a round or twisted belt, 53. The pulleys 52 are seated in line with and slightly within the vertical interval 54 between the bars 73, and thereby the upper side of the belt 53 is carried directly below and in line with said interval. The lower portion of the belt 53 passes once around and is attached to the periphery of an actuating-pulley, 55, seated below, which is adapted to make one revolution in opposite directions alternately. The circumference of the pulley 55 is precisely the same as the length of the flange 51 on the bars 73. A dog, 56, is seated on the upper and horizontal portion of the belt 53, and is provided with external lateral horizontal grooves, 74, which fit over and traverse the flanges 51, and by each revolution of the pulley 55 said dog is carried alternately back and forth the length of the said flanges 51. It will be noticed that the belt 53 is passed downward over the outside of each of the pulleys and once completely around the actuating-pulley 55, and that there is at all times one wind or coil of the belt 53 around the periphery of the pulley 55, the latter having formed on its periphery three spiral grooves to carry the belt 53 in its windings and unwindings thereon. As before stated, the pulley 55 has imparted to it alternately a full revolution in reverse directions, and the circumference of the pulley 55 being that of the length of the flange 51, each full revolution of the pulley 55 will cause the upper portion of the belt 53, carried on the pulley 52, to traverse the full length of the flange 51. The dog 56 is attached to the upper portion of the belt 53 in such relation to the point where the slats 21 successively drop upon the upper surface of the bars 73 directly over and in line with the vertical interval 54 between the bars 73 that the dog 56 shall be at the outer end of said slats when the slat drops on bars 73, and in the movement toward the frame A of the upper side of the belt 53 said dogs shall be carried sufficiently far toward the frame A to push the slat 21 through between the guides L aforesaid, a stop, 57, (see Fig. 4,) at the farther end of the frame A serving to check each of the slats 21 at the same point after they are inserted between said guides L. Full alternate revolutions of the pulley 55 are produced as follows: An upwardly-extending arm, 58, is formed on the shaft 39 opposite to the arm 38, and to the outer extremities of both arms 38 and 58 are attached rods 59, to the outer ends of which are attached belts or chains 75, which are wound in opposite directions around the hub of the pulley 55 from opposite sides of said hub.

The lower rod 59 is connected to the chain 75 by a stirrup, 76, in which the contiguous end of the lower rod 59 is suitably seated on a coiled spring, 77, to insure tension of the chain 75 at the outstroke of the dog 56, so the latter may clear the next slat 21. The oscillation, before described, of said rock shaft 39 (the chains 75 being wound around the hub of the pulley 55 in opposite directions) imparts, by drawing alternately on chains 75, a full revolution to the pulley 55. The arc of oscillation of the ends of the arms 38 and 58, where rods 59 are attached thereto, is equal to the circumference of the hub of the pulley 55, around which said chains 75 are wound, as aforesaid. The oscillation of the arms 38 and 58 on shaft 39 being coincidently in opposite directions, it is obvious that while the draw on the rods 59 occurs only when such arms 38 and 58 alternately rock toward the frame A, yet the unwinding of its chains 75 by one of said arms in the process of rotating the hub of the pulley 55 coincidently winds up on said hub the other of said chains 75 in condition to be unwound, and therefore rotates said pulley 55 in an opposite direction at the next oscillation of the shaft 39.

What I claim as my invention, and desire to secure by Letters Patent of the United States, is—

1. The combination of the rotating shafts H, gears J, pushers M, collars N, pins O, boxes N', bars N², belt T⁵, arm T³, shaft T', arm T, pitman S³, shaft S', pinion S, gear P, and shaft D', substantially as shown, and for the purpose described.

2. The combination of the mutilated gear E, mutilated pinion F, bevel-gear G, horizontal bevel-gear I, and horizontal gears J, provided with guides L and wire-holes J', substantially as shown, and for the purpose described.

3. The combination of the mutilated gear P, pinion S, shaft S', crank S², pitman S³, rock-shaft T', provided with arms T and T³, belts T⁵, and reciprocating bar N², pins O', pushers M, and shaft H, substantially as shown, and for the purpose described.

4. The combination of the winding-shaft 11, provided with ratchet 12, horizontal arms 14, provided with pawl 15, pitman 16, lever 17, rock-shaft 69, provided with arm 70, pitman 71, arm 18, shaft T', and pawl 19, substantially as shown, and for the purpose described.

5. The combination of the rock-shafts 22, provided with stirrers 23 and arm 29, pinion 24, provided with wrist-pin 25, pitman 26, lever 27, vertical pitman 28, and arms 30, and connecting-pitman 31, substantially as shown, and for the purpose specified.

6. The combination of the rock feed-shaft 32, provided with arm 48, dogs 33, mutilated gear 34, mutilated pinion 35, shaft 72, provided with wrist-pin 36, pitman 37, rock-shaft 39, provided with arm 38, arm 46, post 47, segmental gear 40, rack 41, vertical rod 42, provided with arm 49, and coiled spring 50, substantially as shown, and for the purpose described.

7. The combination of the pulley 55, belt 53, pulleys 52, bars 72, dog 56, chains 75 and 59, pitman 38, and means for operating the same, substantially as shown, and for the purpose described.

8. The combination of the mutilated gear 34, pinion 35, shaft 72, provided with wrist 36, pitman 37, rock-shaft 39, provided with arms 38 and 58, rods 59, chains 75, pulley 55, bars 73, each provided with flange 51 and belt-pulleys 52, belt 53, and dog 56, substantially as shown, and for the purpose described.

9. The combination of the shafts 62, arms 63, sheaves 64, arms 65, pitman 66, arm 67, and rock-shaft 69, substantially as shown, and for the purpose described.

In testimony whereof I affix my signature in presence of two witnesses.

GEO. W. PACKER.

Witnesses:
JNO. F. BARRETT,
H. C. WARD.